(12) United States Patent
Hill

(10) Patent No.: US 8,803,659 B2
(45) Date of Patent: Aug. 12, 2014

(54) METHODS AND APPARATUS TO SUPPORT PERSONAL INFORMATION MANAGEMENT

(75) Inventor: Thomas Casey Hill, Crystal Lake, IL (US)

(73) Assignee: BlackBerry Limited, Waterloo, Ontario (CA)

( * ) Notice: Subject to any disclaimer, the term of this patent is extended or adjusted under 35 U.S.C. 154(b) by 680 days.

(21) Appl. No.: 13/036,885

(22) Filed: Feb. 28, 2011

(65) Prior Publication Data

US 2012/0218078 A1   Aug. 30, 2012

(51) Int. Cl.
*G06F 7/04* (2006.01)
*G06Q 10/00* (2012.01)
*A61B 5/117* (2006.01)
*H04W 12/06* (2009.01)

(52) U.S. Cl.
CPC ..................................... *H04W 12/06* (2013.01)
USPC ......................................... 340/5.82; 340/5.81

(58) Field of Classification Search
CPC ....... A61B 5/117; G06Q 10/00; G06Q 99/00; H04L 9/32; G06F 7/04
USPC ............ 705/2, 64; 726/9; 235/380; 340/5.82, 340/5.81
See application file for complete search history.

(56) References Cited

U.S. PATENT DOCUMENTS

| | | | | |
|---|---|---|---|---|
| 5,995,630 | A * | 11/1999 | Borza | 380/54 |
| 6,084,977 | A * | 7/2000 | Borza | 382/124 |
| 7,708,194 | B2 | 5/2010 | Vawter | |
| 7,724,923 | B2 * | 5/2010 | Hamid | 382/115 |
| 8,116,734 | B2 * | 2/2012 | Vawter | 455/411 |
| 8,190,908 | B2 * | 5/2012 | Jazayeri et al. | 713/186 |
| 8,248,237 | B2 * | 8/2012 | Fitzgerald et al. | 340/571 |
| 8,364,131 | B2 * | 1/2013 | Nagaraja | 455/415 |
| 2005/0055582 | A1 | 3/2005 | Bazakos et al. | |
| 2007/0043594 | A1 | 2/2007 | Lavergne | |
| 2009/0192937 | A1 | 7/2009 | Griffin et al. | |
| 2009/0266882 | A1 | 10/2009 | Sajkowsky | |
| 2011/0176667 | A1 * | 7/2011 | Kumar | 379/142.04 |
| 2011/0201306 | A1 * | 8/2011 | Ali Al-Harbi | 455/411 |

FOREIGN PATENT DOCUMENTS

WO   0172224 A1   10/2001

OTHER PUBLICATIONS

NFC Forum, Frequently Asked Questions, NFC for Consumers, http://www.nfc-forum.org/resources/faqs#enabled, 2010, 6 pages.
Blakenhorn, Dana, The cloud can solve our identity problems, http://www.smartplanet.com/technology/blog/thinking-tech/the-cloud-can-solve-ouridentity-problems/4077/, SmartPlanet, May 14, 2010, 3 pages.
European Patent Office, Extended European Search Report issued in European Patent Application No. 12156827.3, dated Aug. 17, 2012, 8 pages.
European Patent Office, Partial European Search Report issued in European Patent Application No. 12156827.3, dated Apr. 26, 2012, 5 pages.
Canadian Intellectual Property Office, "Office Action", issued in connection with corresponding Canadian Patent Application No. 2,769,103, on Jan. 30, 2014 (3 pages).
European Patent Office, "Communication pursuant to Article 94(3) EPC," issued in connection with Application No. 12156827.3, Apr. 25, 2014, 3 pages.

* cited by examiner

*Primary Examiner* — Nam V Nguyen
(74) *Attorney, Agent, or Firm* — Hanley, Flight & Zimmerman, LLC

(57) ABSTRACT

Methods and apparatus to support personal information management are described. One example method includes receiving personal information of a user from a mobile device through close-proximity communication, accessing verification information related to the personal information, obtaining biometric information; and verifying the personal information based on the biometric information and based on a comparison of the verification information and the personal information.

26 Claims, 6 Drawing Sheets

METHODS AND APPARATUS TO SUPPORT PERSONAL INFORMATION MANAGEMENT

FIELD OF THE DISCLOSURE

This disclosure relates generally to communications and, more particularly, to methods and apparatus to support personal information management.

BACKGROUND

Conventionally, personal information, such as identity information, is carried in the form of papers or cards, such as passports, social security cards, driver's licenses, etc. Carrying such disparate forms of personal information can be cumbersome. Additionally, the more separate forms of information that are carried, the easier it is to lose any one of the pieces of information.

DETAILED DESCRIPTION

Figure 1:
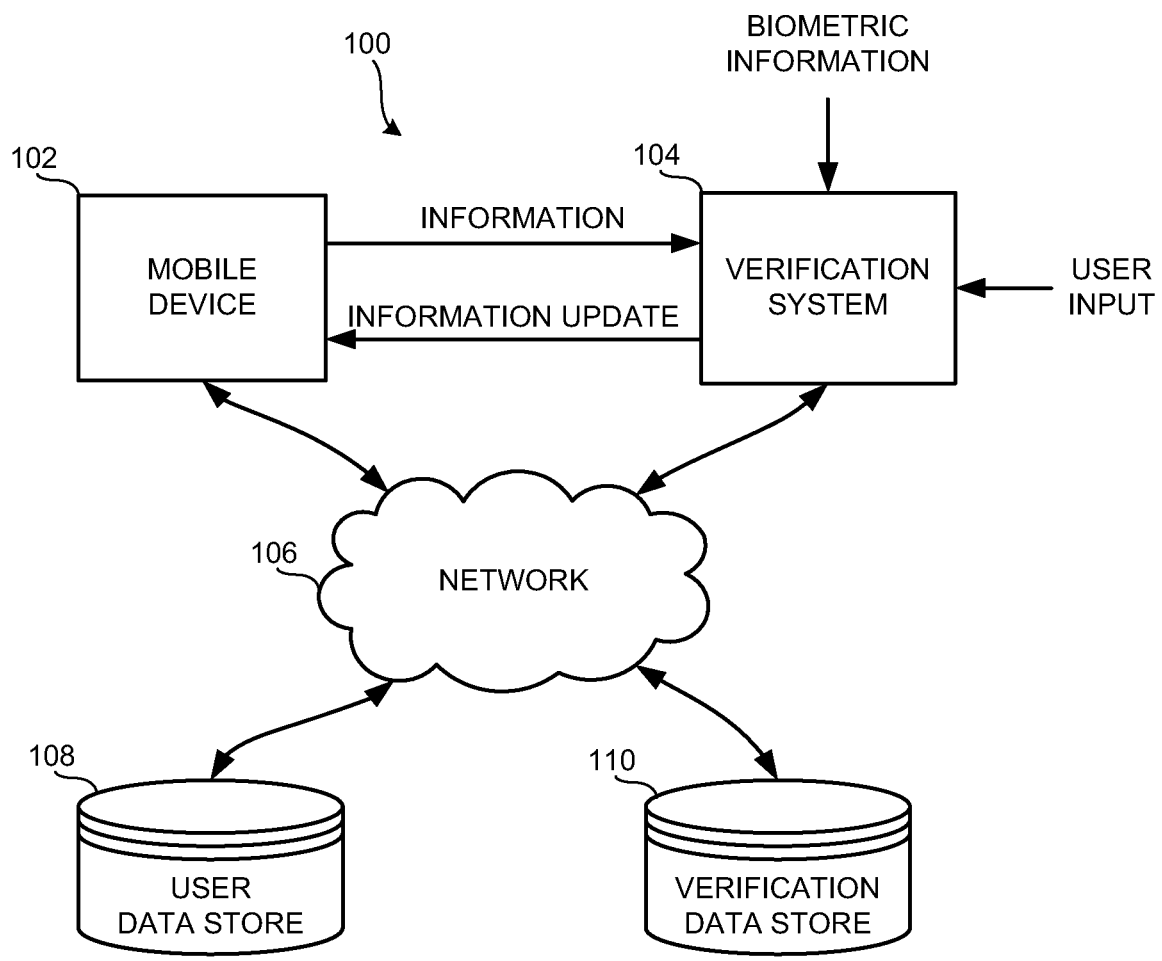
FIG. 1 is a block diagram of an example system to support personal information management.

As described below, close-proximity communication systems, such as radio frequency identification (RFID), near-field communications (NFC), and the like, can be used to transfer information to and/or from a mobile device, such as a smartphone. In this manner, the mobile device may be used as a repository for personal information, such as driver's license information, citizenship information (e.g., passport information), birth certificate information, social security information, or any other government-issued information or identification. The personal information need not be strictly related to government-issued information or identification. Additionally or alternatively, the personal information may be stored on a secure network and the mobile device may access the personal information from the secure network as needed and furnish the personal information. The mobile device may also store historical information such as border crossing history or activity, criminal activity or history, etc.

The personal information being stored on the mobile device, or in a secure location accessible by the mobile device allows for faster transactions with personnel, such as government personal or other security personnel. In one example interaction, a user may present his or her mobile device to government security personnel at, for example, an airport. The government security personnel may obtain personal information, such as driver's license or passport information from the mobile device either visually, by viewing the information on the mobile device, or by transferring the personal information to a verification system through close-proximity communication. The government security personnel can then verify the personal information through checks with another database of information, biometric information (e.g., fingerprints, retinal scans, etc.). If the personal information verifies, the user may be allowed to progress in their travels. If the personal information does not verify, the user may be detained.

In addition to verifying information on the mobile device or accessible by the mobile device, the government official may write information back to the mobile device. The information written back to the device may be historical information such as border crossing history or activity, criminal activity or history, etc. In this manner, the government official may place a virtual stamp on the mobile device, similar to the manner in which a passport is stamped after border crossing. Other information other than border crossing information may be written to the mobile device or the data accessible by the mobile device.

In addition to writing information to the mobile device, the government official may remove or erase information from the mobile device. For example, a government official may revoke a border crossing credential or credentials from a user by removing such credentials from the mobile device or the data accessible by the mobile device. Removing or revoking credentials may not necessitate removal of information from the mobile device or the data accessible by the mobile device. For example, new information may be added to the mobile device and the new information may indicate revocation of the previously stored information. In this manner, by the credential and its revocation may be stored in the mobile device or the data accessible by the mobile device.

One example method described herein includes receiving personal information of a user from a mobile device through close-proximity communications; accessing verification information related to the personal information; obtaining biometric information from the user; and verifying the personal information based on the biometric information and based on a comparison of the verification information and the personal information.

Another example method includes receiving personal information of a user from a mobile device through close-proximity communications, wherein the personal information includes government-issued credentials of the user; and accessing verification information related to the personal information; verifying the personal information based on a comparison of the verification information and the personal information.

An example method described herein includes receiving personal information of a user at a mobile device through close-proximity communications; storing the personal information in the mobile device; retrieving the personal information in the mobile device; transferring the retrieved personal information to a government official through close-proximity communication to facilitate verification of the personal information with verification information obtained from another information source; and obtaining a verification indication based on the verification information.

FIG. 1 depicts a block diagram of a system to support personal information management 100 including a mobile device 102 and a verification system 104. The mobile device 102 and the verification system 104 may each be coupled to a network 106, which may be further coupled to a user data store 108 and a verification data store 110.

The mobile device 102 may be a smartphone, a cellular telephone, a tablet computer, a laptop computer, or any other suitable device. The mobile device 102 may exchange information with the verification system 104 using any suitable communication technique. For example, the mobile device may transmit information to the verification system and receive information updates using, for example, NFC, RFID, Bluetooth, wireless fidelity (WIFI), or any other suitable communication technique. The mobile device 102 may store information, such as personal information, credentials, authorizations, and the like, of the user of the mobile device 102. Additionally, the mobile device 102 may store information related to individuals that are not the user of the mobile device 102, but are with the user of the mobile device 102. For example, if a parent is travelling with children, passport information of the children may stored in the mobile device 102 of the parent user. Alternatively, rather than the mobile device 102 storing the information, the mobile device 102 may store one or more links to the information, wherein the information is stored separate from the mobile device 102 and is accessed by the mobile device 102 over the network 106. The information stored in the mobile device 102 may be inputted to the mobile device 102 through close-proximity communication (e.g., NFC), bar code scanning, manual entry, or by any other suitable method or technique.

The verification system 104 may be a terminal, a computer, a kiosk, or any suitable configuration that is configured to receive and verify information from the mobile device 102. The verification system 104 may be portable or may be a fixed installation. The verification system 104 may be operated by a government official, such as a police officer, an immigration or border officer, etc. The verification system 104 may, for example, display the information received from the mobile device 102 and allow an official, such as, for example, an immigration officer or a police officer, to verify such information while conversing with the user of the mobile device 102. Additionally or alternatively, the verification system 104 may use information from the mobile device 102 as a key to retrieve additional information from an alternate source that may be used to verify the information provided by the mobile device 102. The verification system 104 may also receive biometric information from the user of the mobile device 102 and may use such information to verify the information provided by the mobile device 102 and/or to verify the identity of the person currently using the mobile device 102. The verification device 102 may also receive user input from, for example, an official, through a user input interface.

The information transferred from the mobile device 102 to the verification system 104 may be personal information, credentials, government-issued identification, etc. related to a user of the mobile device 102. For example, the information may be passport information and/or driver's license information and/or historical information. The verification system 104 may verify the information provided by the mobile device 102, as well as the identity of the person currently using the mobile device 102, to verify that the user matches the information provided by the mobile device 102.

Information update transferred from the verification system 104 to the mobile device 102 may be information that updates the information provided by the mobile device 102 to the verification system 104. For example, the information may be credentials that may be updated or renewed by the verification system 104. Alternatively, the information update may be additional information provided by the verification system 104 to the mobile device 102. The information update may include, but is not limited to, indications that the user of the mobile device 102 has crossed a geographic or national border, permission or credentials to cross geographic or national borders, revocation of permission or credentials to cross geographic borders, information related to traffic violations, or any other suitable information that updates the mobile device 102.

The network 106 may be implemented using the Internet, a local area network (LAN), a wide network (WAN), or any other network. Additionally, the network 106 may be a collection of networks that collectively form the network 106. The network 106 may be a public or a private network.

The user data store 108, which is accessible by the network 106 may be located on a server inside a secure network. The user data store 108 may store personal information, credentials, government-issued information, and the like related to the user of the mobile device 102. In one example, the user data store 108 may store passport and driver's license information related to the user of the mobile device 102. In one example, the mobile device 102 may use a secure connection to the user data store 108 to the information (e.g., personal information, credentials, etc.) of the user. Such a secure connection may be implemented using a virtual private network (VPN) connection, a public/private key system, or the like.

The verification data store 110 may store information related to the user of the mobile device 110, wherein such information is not necessarily accessible by the user. For example, the verification data store 110 may be a governmental database that is accessible only by governmental officials so that the information in the verification data store 110 is governmentally certified to be accurate and, thus, may be used to verify information provided by the mobile device 102 to the verification data system 104. The verification system 104 may access the verification data store 110 through any suitable wired or wireless connection, which may include the use of encryption, VPN(s), public/private keys, or the like.

Figure 2:
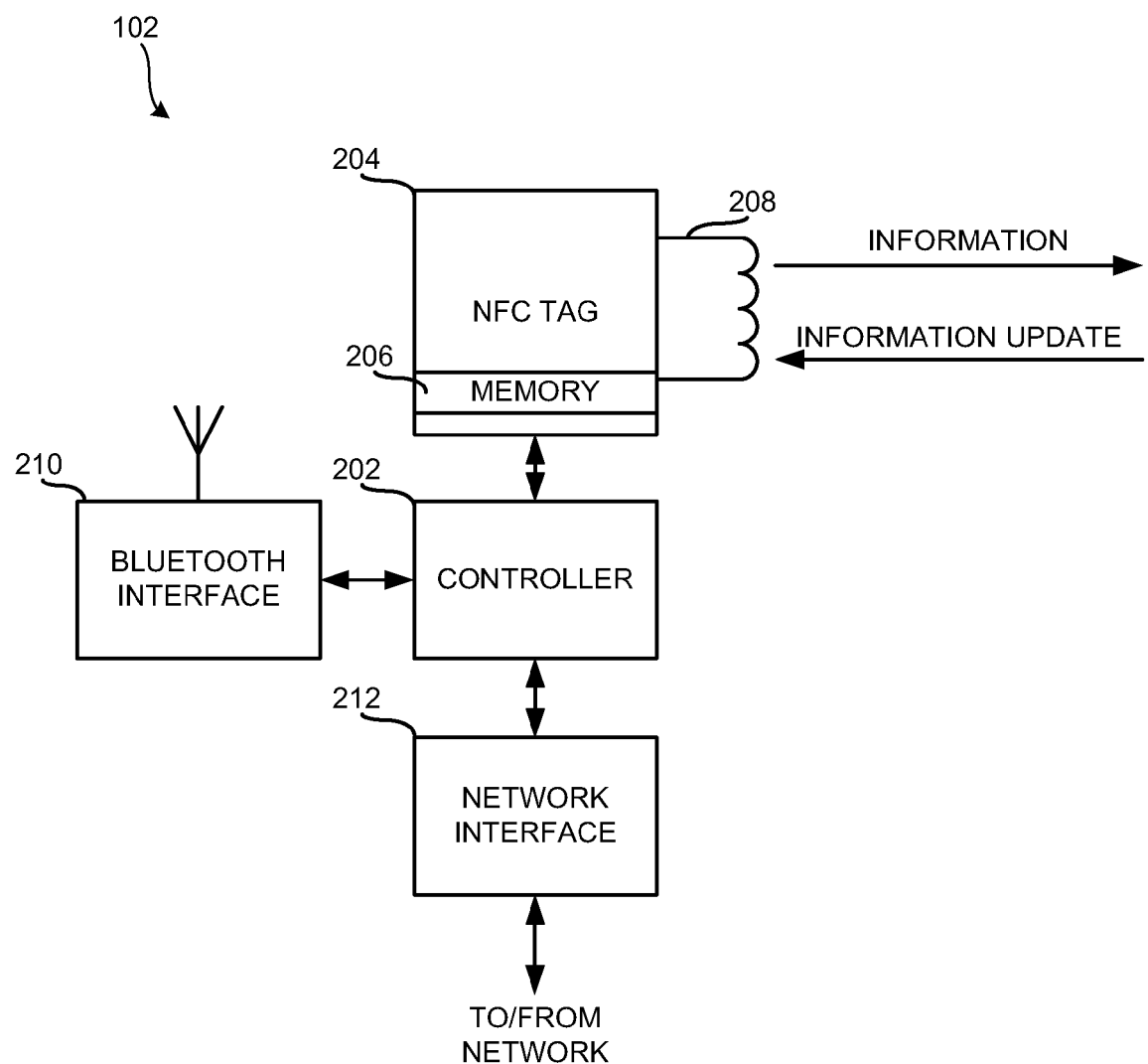
FIG. 2 is a diagram of an example mobile device for use in the system of FIG.

Further detail regarding aspects of the mobile device 102 is shown in FIG. 2. The mobile device 102 includes a controller 202 that is connected to a close-proximity communication device, such as an NFC tag 204.

The controller 202 may be implemented using any suitable microcontroller or microprocessor capable of executing instructions. Additionally, the controller 202 may include hardware implementations, such as application-specific integrated circuits (ASIC), programmable logic devices (PLDs), or any other suitable logic device or devices.

The NFC tag 204 includes a memory 206 and an antenna 208. In one example, the NFC tag 204 is implemented according to the International Standards Organization standard ISO 14443. Implementation according to other standards is possible. The memory 206 may store information related to the user of the mobile device 102, such as personal information, credentials, authorizations, historical information, etc., that may be transferred to the verification system 104 upon the NFC tag 204 being interrogated. The information may be inputted into the memory 206 manually, via close-proximity communication (e.g., NFC), via scanning, or through any other suitable technique. In addition, the NFC tag 204 may receive information updates that are provided by the verification system 104. The information updates may be stored in the memory 206 of the NFC tag 204 and/or may be transferred to one or more data stores (e.g., the user data store 108) across the network 106. While the close-proximity communication device is described as being an NFC tag 204, other types of close-proximity communication devices may be utilized instead of, or in addition to, the NFC tag 204.

The NFC tag 204 may store information (e.g., credentials) or may store pointers to information that may be retrieved over the network by the controller 202 via a Bluetooth interface 210 or over a network interface 212. In some examples, all the information may be stored across a network, or the NFC tag 204 may store information and may store pointers to information.

The network interface 212 may be implemented using any wired or wireless communication interface. For example, the network interface 212 may be implemented using an Ethernet connection, or any other wired connection. Alternatively, the network interface 212 may be implemented using a WIFI interface, a cellular modem, which may be a second generation (2G) and/or third generation (3G) and/or fourth generation (4G) cellular modem, or the like, and/or any other wireless network interface. Although shown as having a single network interface 212 the mobile device 102 may include several different network interfaces using one or more different wireless access technologies.

Figure 3:
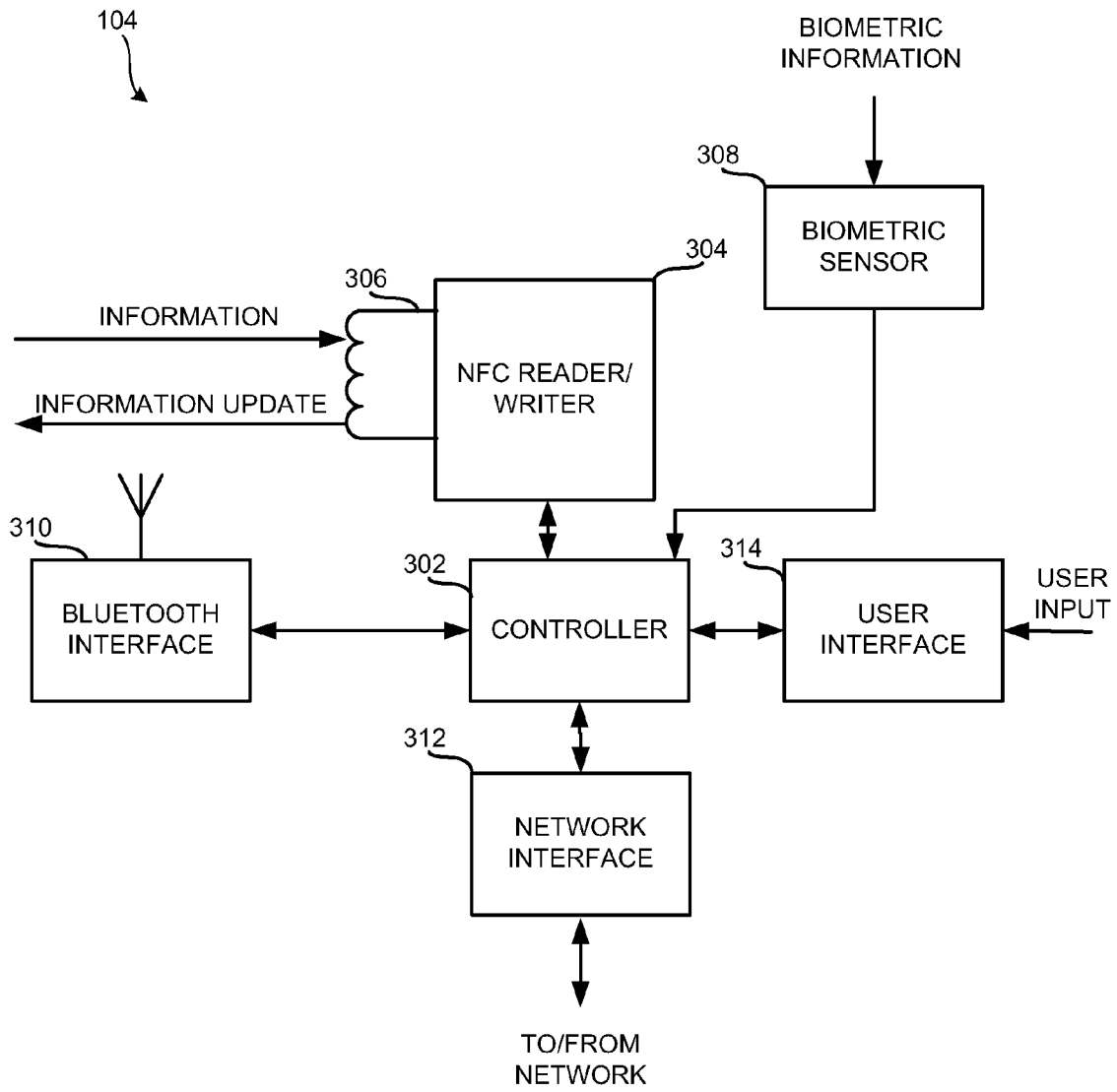
FIG. 3 is a diagram of an example verification system for use in the system of FIG. 1.

In one example, the verification system 104, which is shown in FIG. 3, includes a controller 302 that is coupled to a close-proximity communication device, such as the NFC reader/writer 304 including an associated antenna 306. The verification system 104 also includes a biometric sensor 308, a Bluetooth interface 310, a network interface 312, and a user interface 314.

The controller 302 may be implemented using any suitable microcontroller or microprocessor capable of executing instructions. Additionally, the controller 302 may include hardware implementations, such as application-specific integrated circuits (ASIC), programmable logic devices (PLDs), or any other suitable logic device or devices.

The NFC reader/writer 304 is configured to interrogate, send commands and information to, and receive information from the NFC tag 204 of FIG. 2. In one example, the NFC reader/writer 304 is implemented according to the International Standards Organization standard ISO 14443. Implementation according to other standards is possible. In one example, the NFC reader/writer 304 is configured to interrogate the NFC tag 204 and receive information from the NFC tag 204. As described above, the information received at the NFC reader/writer 304 from the NFC tag 204 may include personal information, credentials, which may be government-issued credentials, etc. Additionally, the NFC reader/writer 304 is configured to send information updates to the NFC tag 204. As described above, the information updates may include changes to user credentials, history information, such as border crossing history, etc.

The biometric sensor 308 may be included in the verification system 104 to facilitate the reading of biometric information from a user, such as a user of the mobile device 102. In some examples, the biometric sensor 308 may be a fingerprint reader, a retinal scanner, or any other suitable biometric sensor 308 capable of obtaining biometric information that may be used to verify an identity of the user of the mobile device 102.

The Bluetooth interface 310 is configured to facilitate Bluetooth communications with, for example, the mobile device 102, or any other suitably equipped device or component. For example, the Bluetooth interface 310 may facilitate information exchange between the mobile device 102 and the verification system 104, or information exchange between the verification system 104 and any suitable Bluetooth network that may be available.

The network interface 312 may be implemented using any wired or wireless communication interface. For example, the network interface 312 may be implemented using an Ethernet connection, or any other wired connection. Alternatively, the network interface 312 may be implemented using a WIFI interface, a cellular modem, which may be a second generation (2G) and/or third generation (3G) cellular modem, or the like, and/or any other wireless network interface. Although shown as having a single network interface 312 the verification system 104 may include several different network interfaces using one or more different wired or wireless access technologies.

The user interface 314 may include hardware and software to allow a user, such as a government official or any other suitable user, to interface with the controller 302. For example, the user interface 314 may include a display screen and a keyboard and/or any other suitable input device, such as a touch-screen. The user interface 314 allows a user to see information, such as verification information, that is produced by the controller 302. The user interface 314 also allows the user to provide information, such as text or any other suitable input, to the controller 302.

Block diagrams of apparatus and flowcharts representative of example processes that may be executed to implement some or all of the elements and devices described herein are described below and shown in the drawings. In these examples, the process represented by each flowchart may be implemented by one or more programs comprising machine readable instructions for execution by a processor or controller, such as shown in FIGS. 1, 2 and/or 3, and/or any other suitable device.

The one or more programs may be embodied in software or software instructions stored on a tangible medium such as, for example, a flash memory, a CD-ROM, a hard drive, a DVD, or a memory associated with a processor, but the entire program or programs and/or portions thereof could alternatively be executed by a device other than the microprocessor and/or embodied in firmware or dedicated hardware (e.g., implemented by an application specific integrated circuit (ASIC), a programmable logic device (PLD), a field programmable logic device (FPLD), discrete logic, etc.). For example, any one, some or all of the example mobile communications system components could be implemented by any combination of software, hardware, and/or firmware. Also, some or all of the processes represented by the flowcharts may be implemented manually. As used herein, the term tangible computer readable medium is expressly defined to include any type of computer readable storage.

Additionally or alternatively, the example processes described herein may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium.

Figure 4:
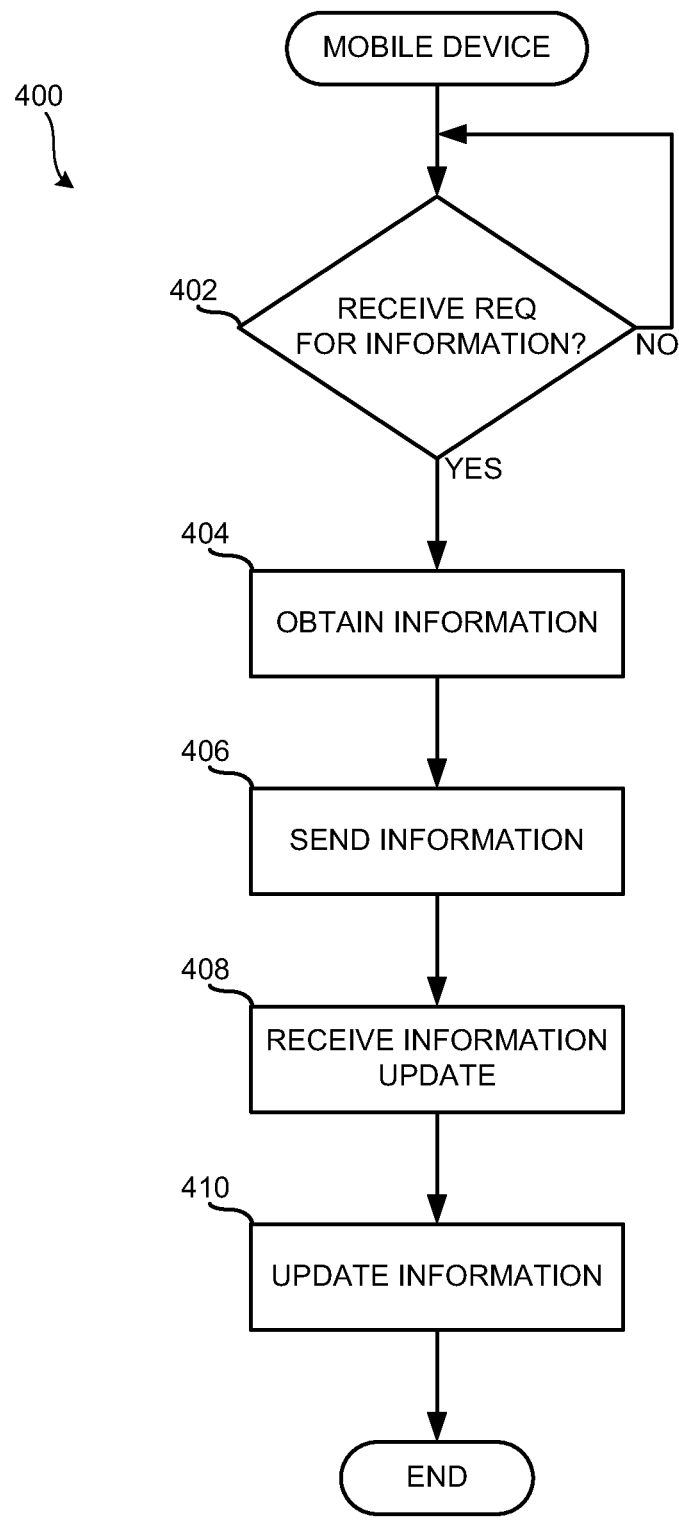
FIG. 4 is a flow diagram of an example process that may be carried out by the mobile device of FIG. 1 and FIG. 2.

A process 400, as shown in FIG. 4, may be carried out by a mobile device, such as the mobile device 102 of FIG. 1 and/or FIG. 2. The mobile device 102 monitors for requests for information (block 402). Monitoring for such requests may include the NFC tag 204 remaining in a low power mode until, for example, an interrogation signal is sent by the NFC reader/writer 304 and received at the NFC tag 204, at which time the NFC tag 204 enters an active power mode and may additionally activate the controller 202.

When a request for information is received (block 402), the NFC tag 204 obtains the requested information (block 404). The requested information may be obtained by reading the memory 206 of the NFC tag 204 to obtain the requested information. Alternatively, the requested information may be obtained by reading one or more pointers from the memory 206, which enables the controller 202 to access, for example, the user data store 108 through the network interface 212 and/or the Bluetooth interface 210.

After the information is obtained (block 404), the NFC tag 204 sends the information to the NFC reader/writer 304 in response to the interrogation signal (block 406).

If any information update is sent by the NFC reader/writer 304, the information update is received at the mobile device 102 (block 408) and the information in the mobile device 102 is updated (block 410). Alternatively, if the information is stored separate from the mobile device 102, such as in the user data store 108, the information stored separate from the mobile device is updated at the separate location. The information update may be, for example, updates to personal information, updates to credentials (e.g., the issuance of additional credentials or the revocation of prior credentials, such as border crossing or driving credentials), history information (e.g., information related to user activities such as criminal activity, border crossings, driving infractions, etc.). In some examples, the information update may be historical information, such as a virtual passport stamp.

Figure 5:
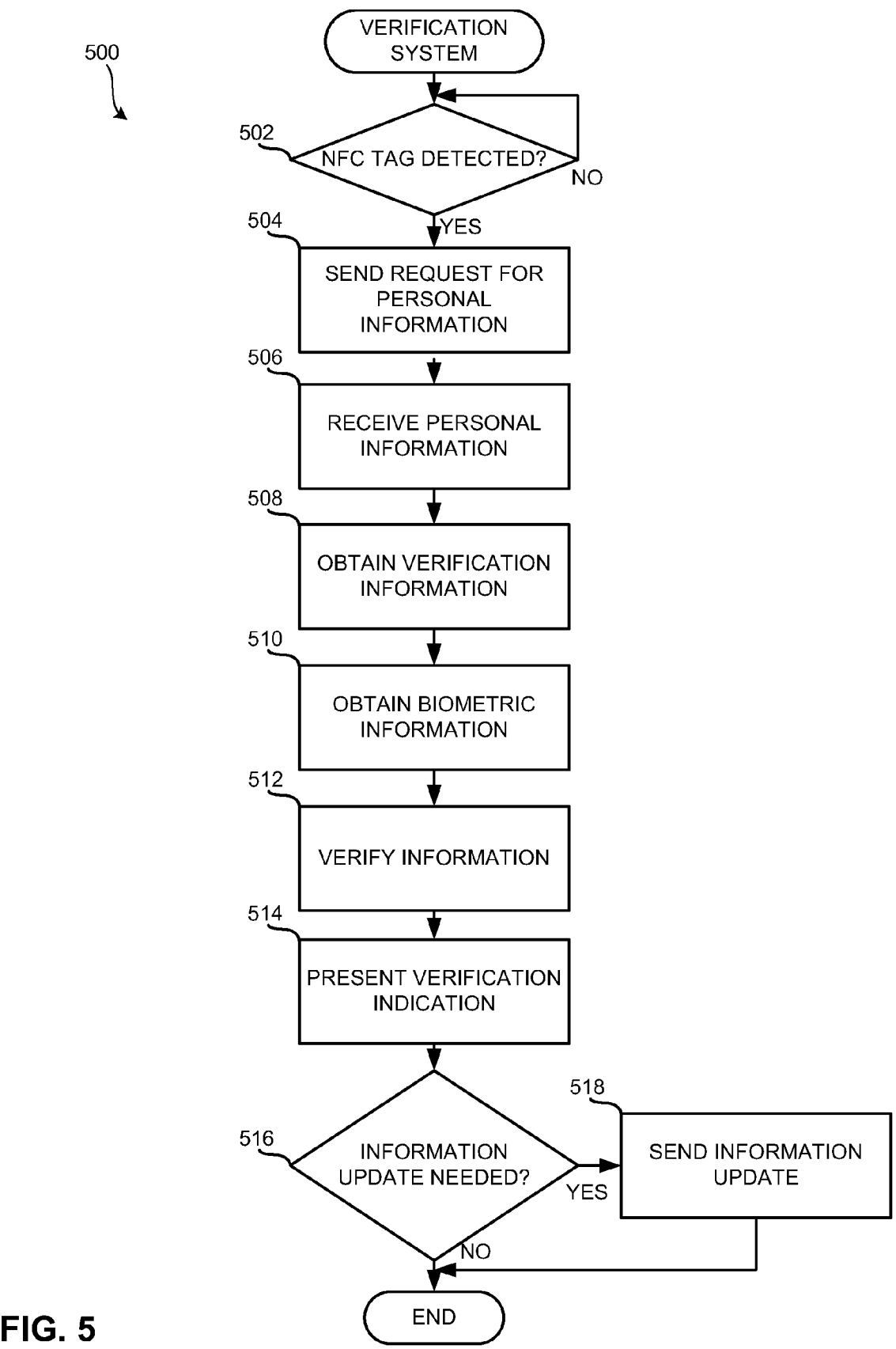
FIG. 5 is a flow diagram of an example process that may be carried out by the verification system of FIG. 1 and FIG. 3.

A process 500, as shown in FIG. 5, may be carried out by a verification system, such as the verification system 104 of FIG. 1 and/or FIG. 3. The verification system 104 monitors for the presence of an NFC tag (block 502). Monitoring for NFC tag presence may include the periodically sending interrogation signals or any other suitable signals to which NFC tags, such as the NFC tag 204, can respond.

When an NFC tag is detected (block 502), the verification system 104 sends a request for information via the NFC protocol to the NFC tag (block 504). In response to the request, the verification system 104 receives the requested information from the NFC tag, such as the NFC tag 204 (block 506) and obtains verification information (block 508) that may be used to verify the information received from the NFC tag. The verification information may be information stored in the verification data store 110 or in any other suitable location. The verification information is any information that may be used to verify the veracity of the information provided by the NFC tag 204 of the mobile device 102. For example, the verification information may be personal information related to the user of the mobile device 102, such as date of birth, driver's license or passport number, home address, social security number, photos, etc. In one example, the verification information is controlled by a government agency (e.g., the Department of State, the Department of Motor Vehicles, etc.) and, therefore, the integrity of the verification information is extremely high and may be used to verify other information, such as the information provided by the mobile device 102.

In some examples, the verification system 104 may obtain biometric information of the user of the mobile device 102 (block 510). The biometric may be, retinal scans, fingerprint scans, etc. and may be obtained via the biometric sensor 308.

After the information, the verification information, and/or the biometric information are received, the information is verified against the verification information and the biometric information (block 512). For example, a user's date of birth, photo and address may be provided in the information and these pieces of data may be verified against the verification information, which provides a reference for the user's date of birth, photo, and address. Additionally, the information provided by the mobile device 102 may include data representative of retinal or fingerprint scan results. For example, a retinal scan or fingerprint of the user may be represented in the information as a signature or number. The information obtained by the biometric sensor 308 may be processed in the same manner as the information from the mobile device 102 is processed and, therefore, should result in matching or substantially matching signatures or numbers for the same retinal scan or fingerprint scan. In this manner, the information may be verified against the biometric information. Thus, the information may be verified against the verification information and the biometric information and a verification indication is presented (block 514). The verification indication may be presented in any manner using one or more of audio, visual, and tactile feedback that maybe presented via the user interface 314 of FIG. 3.

Based on the verification, or separate therefrom, the verification system 104 determines if an information update is needed (block 516). The necessity of an information update may be determined automatically based on the verification or may be determined by personnel, such as a government official.

If an information update is needed (block 516), the information update is sent to the mobile device (block 518). Information updates may take various forms that range from updating credentials, such as border crossing credentials or driving credentials to updating history of a user. For example, if a government official at a customs and immigration facility determines that user of the mobile device 102 has his or her border crossing credentials revoked, the information update provides an indication of such a revocation and is sent to the mobile device 102. By way of another example, if the user of the mobile device 102 is crossing a border and is authorized to do so, an indication of the border crossing location, date and time may be written in an information update to the mobile device 102. If no information update is needed, the process 500 ends.

Figure 6:
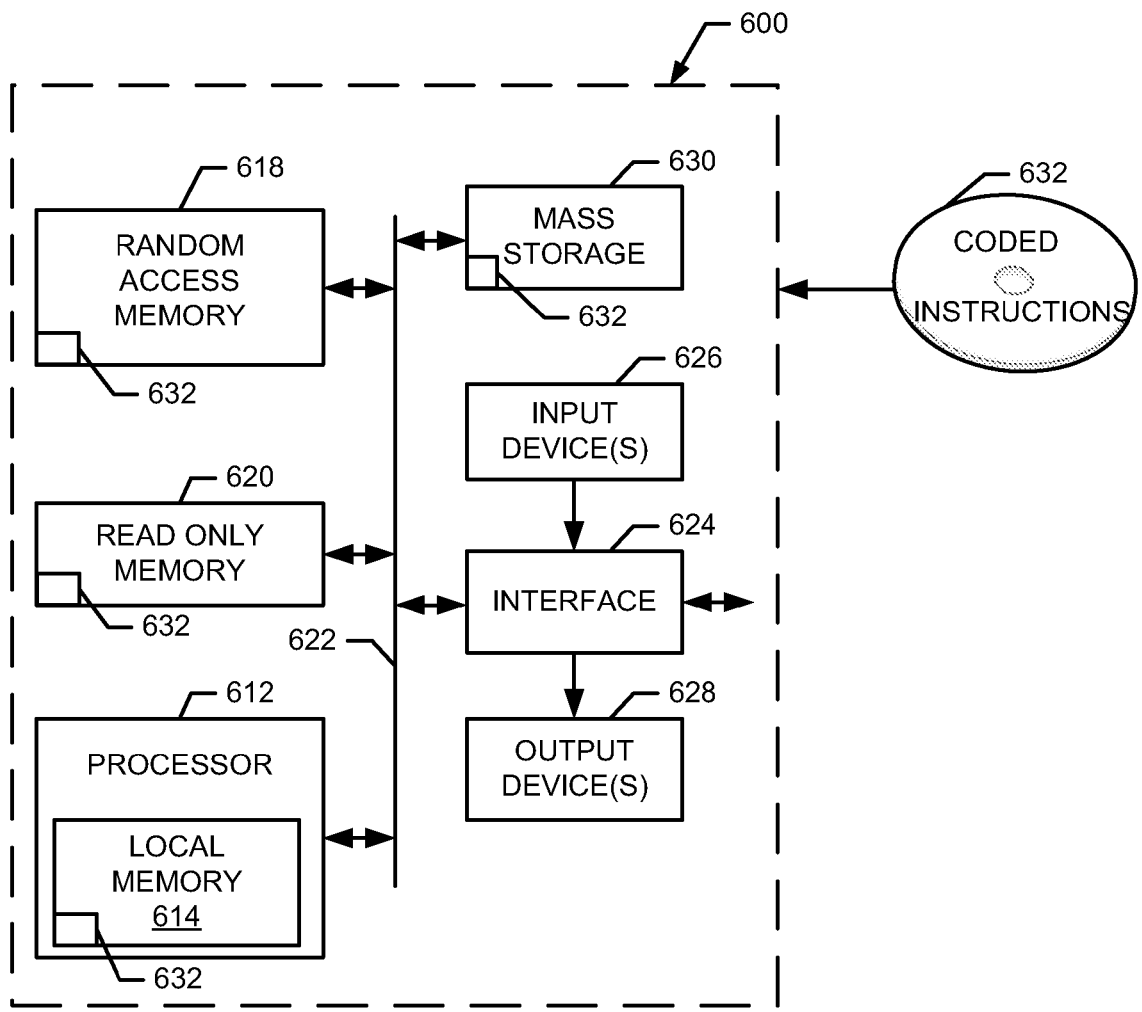
FIG. 6 is a block diagram of example hardware and software that may be used to implement the block diagrams and processes described above.

FIG. 6 is a block diagram of an example processing system 600 capable of implementing the apparatus and methods disclosed herein. The processing system 600 can correspond to, for example, a mobile device, a verification system, or any other type of computing device.

The system 600 of the instant example includes a processor 612 such as a general purpose programmable processor, an embedded processor, a microcontroller, etc. The processor 612 includes a local memory 614, and executes coded instructions 632 stored in the local memory 614 and/or in another memory device. The processor 612 may execute, among other things, machine readable instructions to implement any, some or all of the processes represented in FIGS. 4-5. The processor 612 may be any type of processing unit, such as one or more microprocessors, one or more microcontrollers, etc. Other processing devices may also be used.

The processor 612 is in communication with a main memory including a volatile memory 618 and a non-volatile memory 620 via a bus 622. The volatile memory 618 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 620 may be implemented by flash memory and/or any other desired type of memory device. Access to the main memory 618, 620 is typically controlled by a memory controller (not shown).

The system 600 also includes an interface circuit 624. The interface circuit 624 may be implemented by any type of interface standard, such as an Ethernet interface, a universal serial bus (USB), and/or a third generation input/output (3GIO) interface.

One or more input devices 626 are connected to the interface circuit 624. The input device(s) 626 permit a user to enter data and commands into the processor 612. The input device(s) can be implemented by, for example, a keyboard, a mouse, a touchscreen, a track-pad, a trackball, an isopoint and/or a voice recognition system.

One or more output devices 628 are also connected to the interface circuit 624. The output devices 628 can be implemented, for example, by display devices. The interface circuit 624, may include a graphics driver card.

The interface circuit 624 also includes a communication device such as a modem or network interface card to facilitate exchange of data with external computers via a network (e.g., an Ethernet connection, a digital subscriber line (DSL), a telephone line, coaxial cable, a cellular telephone system such as an EGPRS-compliant system, etc.).

The system 600 also includes one or more mass storage devices 630 for storing software and data. Examples of such mass storage devices 630 include any type of memory.

As an alternative to implementing the methods and/or apparatus described herein in a system such as shown in FIG. 6, the methods and or apparatus described herein may be embedded in a structure such as a processor and/or an ASIC (application specific integrated circuit).

Further, although the example processes are described with reference to flowcharts, many other techniques for implementing the example methods and apparatus described herein may alternatively be used. For example, with reference to the flowcharts, the order of execution of the blocks may be changed, and/or some of the blocks described may be changed, eliminated, combined, and/or subdivided into multiple blocks. Any of the described blocks may be as implemented as part of an existing system. While the example block diagrams are described as implementing the processes of the flowcharts, the apparatus of the block diagrams may implement any process and, likewise, the processes of the flowcharts may be implemented by any apparatus, device, system, software, or combination thereof.

Finally, although certain example methods, apparatus and articles of manufacture have been described herein, the scope of coverage of this disclosure is not limited thereto. On the contrary, this disclosure covers all methods, apparatus and articles of manufacture and equivalents described and claimed herein.

What is claimed is:

1. A method comprising:
receiving first personal information of a user from a mobile device and second personal information of a second person associated with the user of the mobile device through close-proximity communication;
accessing first verification information related to the first personal information and second verification information related to the second personal information;
obtaining biometric information from the user and from the second person;
verifying the first personal information based on the first biometric information and based on a comparison of the first verification information and the first personal information; and
verifying the second personal information based on the second biometric information and based on a comparison of the second verification information and the second personal information.

2. The method of claim 1, wherein receiving the first personal information comprises use of a near-field communication device in the mobile device.

3. The method of claim 2, wherein the near-field communication device is to store the first personal information and the second personal information.

4. The method of claim 2, wherein the near-field communication device is to store identification information used to obtain the first personal information and the second personal information.

5. The method of claim 1, wherein the first personal information or the second personal information comprises citizenship information.

6. The method of claim 1, wherein the first personal information or the second personal information comprises passport information.

7. The method of claim 1, wherein the first personal information comprises history information of the user.

8. The method of claim 1, wherein the first personal information comprises a border crossing credential of the user.

9. The method of claim 8, further comprising removing the border crossing credential of the user.

10. The method of claim 1, further comprising writing history information of the user or of the second person to the mobile device.

11. A method comprising:
receiving first personal information of a user from a mobile device and second personal information of a second person associated with the user of the mobile device through close-proximity communication, wherein the first personal information includes a first government-issued credential of the user and the second personal information includes a second government-issued credential of the second person;
accessing first verification information related to the first personal information and second verification information related to the second personal information;
verifying the first personal information based on a comparison of the first verification information and the first personal information; and
verifying the second personal information based on a comparison of the second verification information and the second personal information.

12. The method of claim 11, wherein receiving the first personal information of the user or the second personal information of the second person comprises the use of a near-field communication device in the mobile device.

13. The method of claim 12, wherein the near-field communication device stores identification information used to obtain the first personal information or the second personal information.

14. The method of claim 11, wherein the first government-issued credential comprises a border crossing credential.

15. The method of claim 14, further comprising removing the border crossing credential of the user from the mobile device.

16. A method comprising:
receiving first personal information of a user at a mobile device through close-proximity communication;
receiving second personal information of a second person associated with the user of the mobile device through close-proximity communication;
storing the first and second personal information in the mobile device;
retrieving the second personal information in the mobile device;
transferring the second retrieved personal information to another device through close-proximity communication to facilitate verification of the second personal information with verification information obtained from another information source; and obtaining a verification indication based on the verification information.

17. The method of claim 16, wherein receiving first and second personal information of the user comprises near-field communication.

18. The method of claim 16, further comprising receiving the first personal information of the user by scanning a document indicative of the first personal information.

19. The method of claim 18, wherein scanning the document comprises scanning a bar code on the document.

20. The method of claim 16, wherein receiving the first personal information comprises retrieving information stored separate from the mobile device.

21. The method of claim 16, wherein the first and second personal information comprises citizenship information.

22. The method of claim 16, wherein the first and second personal information comprises passport information.

23. A mobile device comprising:
a close-proximity communication device;
a memory associated with the close-proximity communication device; and
a controller coupled to the close-proximity communication device, wherein the controller is programmed to at least:
receive first personal information of a user through the close-proximity communication device;
receive second personal information of a second person associated with the user of the mobile device through close-proximity communication;
store the first and second personal information in the memory;
transfer the second personal information to another device using the close-proximity communication device to facilitate verification of the second personal information with verification information obtained from another information source; and
obtain a verification indication.

24. The mobile device of claim 23, wherein the close-proximity communication device comprises a near-field communication device.

25. The mobile device of claim 23, wherein the controller is programmed to receive the first personal information by scanning a document indicative of the first personal information.

26. The mobile device of claim 23 further comprising a network interface, wherein he controller is programmed to retrieve the first and second personal information using the network interface.

* * * * *